UNITED STATES PATENT OFFICE.

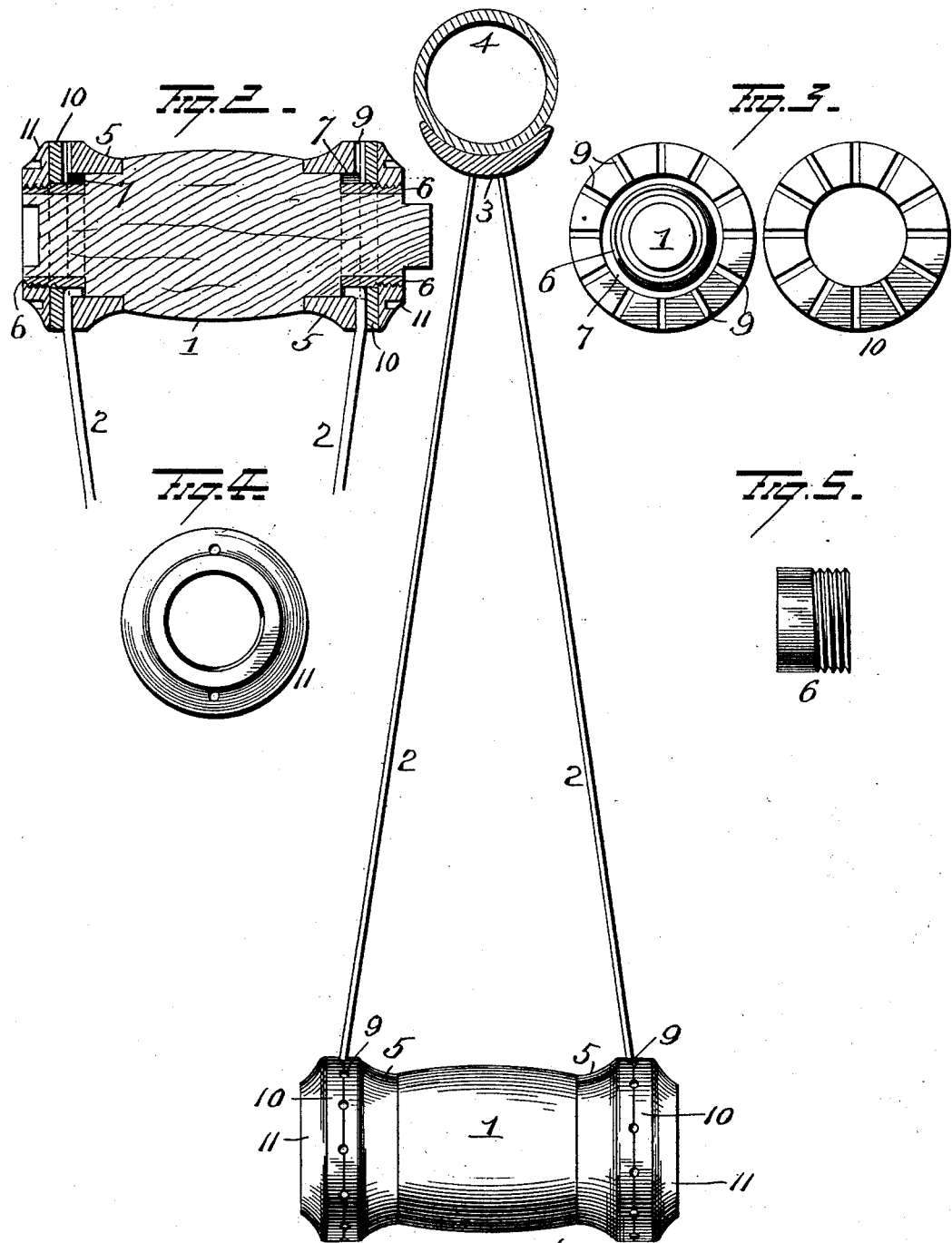

JACOB KRAUSS, OF LEXINGTON, KENTUCKY.

WHEEL-HUB.

SPECIFICATION forming part of Letters Patent No. 715,087, dated December 2, 1902.

Application filed July 8, 1902. Serial No. 114,799. (No model.)

*To all whom it may concern:*

Be it known that I, JACOB KRAUSS, a resident of Lexington, in the county of Fayette and State of Kentucky, have invented certain new and useful Improvements in Wheel-Hubs; and I do hereby declare the following to be a full, clear, and exact description of the invention, such as will enable others skilled in the art to which it appertains to make and use the same.

My invention relates to an improvement in wheel-hubs, and more particularly to an improved hub for wheels having wire spokes, the object of the invention being to provide an improved wooden hub which can be bored and trued as desired and provide improved means for clamping the spokes in position permitting the removal and replacing of a single spoke or several or all of the spokes when found advisable or necessary.

With this object in view the invention consists in certain novel features of construction and combinations and arrangements of parts, as will be more fully hereinafter described, and pointed out in the claim.

In the accompanying drawings, Figure 1 is a view, showing the hub in elevation and the rim and tire in section, illustrating my improvements. Fig. 2 is a view in section; and Figs. 3, 4, and 5 are views illustrating details of construction.

1 represents my improved hub connected by wire spokes 2 with an ordinary wheel-rim 3, which may or may not carry a pneumatic or cushion tire 4.

The hub 1 is composed of a solid block of hard wood rounded into the shape desired and recessed and contracted at both ends to receive metal attachments, as will now be described.

Firmly seated in the recessed ends of the wooden hub 1 are metal rings 5, and on the contracted ends of the hub externally-screw-threaded sleeves 6 are fixed, the internal diameter of rings 5 being sufficiently greater than the external diameter of sleeves 6 to leave an annular recess or pocket 7 at the inner edge of the ring for a purpose which will hereinafter appear.

The rings 5 are provided on their straight faces with radial recesses 9 to receive the spokes 2, which latter are bent inward at their ends to project into annular recess 7, and a washer 10, recessed to conform to the ends of the spokes in ring 5, is held securely against the same by a threaded ring 11, having notches or holes therein to receive a spanner-wrench.

With my improved spoke-securing mechanism it will be seen that one spoke can be easily removed and replaced without disturbing the others, as the threaded ring 11 may be unscrewed but a short distance, far enough to permit the operator to turn the spoke 2 until its bent end is out of the annular recess 7, when the spoke can be lifted out of the hub, and when replaced and turned to project its bent end into the annular recess 7 ring 11 can be screwed home and the wheel be perfect, as before. It will also be seen that by making the hub of wood it can be bored with a regular boxing-machine in the ordinary manner employed with wooden wheels. The boxing can then be inserted and wedged tight and true in the ordinary way, permitting the use of a spindle or axle without ball or roller bearings.

A great many slight changes might be made in the general form and arrangement of parts described without departing from my invention, and hence I do not limit myself to the precise construction set forth, but consider myself at liberty to make such changes and alterations as fairly fall within the spirit and scope of my invention.

Having fully described my invention, what I claim as new, and desire to secure by Letters Patent, is—

The combination with a wooden hub, of rings attached to said hub near its ends, each of said rings forming an annular recess near the end of the hub and said rings having radial recesses to receive the wheel-spokes, wheel-spokes bent at their ends to enter the recess, washers to lie against the spokes, and recessed to receive them, threaded sleeves on the ends of the hub, and clamping-rings on said sleeves forced against the washers.

In testimony whereof I have signed this specification in the presence of two subscribing witnesses.

JACOB KRAUSS.

Witnesses:
CHAS. H. TROST,
M. B. MITCHELL.